TUNABLE SINE WAVE RINGING GENERATOR

Filed June 12, 1968 6 Sheets-Sheet 1

Aug. 4, 1970 E. C. RHYNE, JR., ET AL 3,523,255

TUNABLE SINE WAVE RINGING GENERATOR

Filed June 12, 1968 6 Sheets-Sheet 2

Aug. 4, 1970 E. C. RHYNE, JR., ET AL 3,523,255

TUNABLE SINE WAVE RINGING GENERATOR

Filed June 12, 1968 6 Sheets-Sheet 4

Aug. 4, 1970 E. C. RHYNE, JR., ET AL 3,523,255

TUNABLE SINE WAVE RINGING GENERATOR

Filed June 12, 1968 6 Sheets-Sheet 6

United States Patent Office 3,523,255
Patented Aug. 4, 1970

3,523,255

TUNABLE SINE WAVE RINGING GENERATOR

Earl C. Rhyne, Jr., Millis, Ray A. Bennett, Billerica, and Zissis Kalivas, Stow, Mass., assignors to Dielectric Products Engineering Co., Inc., a corporation of Michigan Filed June 12, 1968, Ser. No. 736,460
Int. Cl. H03b
U.S. Cl. 331—56 4 Claims

ABSTRACT OF THE DISCLOSURE

A plurality of oscillators each provides a signal having a determined frequency. A plurality of shapers and amplifiers are connected to the oscillators and each shapes and amplifies the signals provided by the oscillators. A plurality of bridges are connected to the shapers and amplifiers and each provides full wave switching of the shaped, amplified signals under the control of the corresponding one of the signals. Each of a plurality of power supplies is connected to a corresponding one of the bridges for energizing the corresponding bridge. The power supplies are energized with an input voltage. A plurality of filters are connected to the bridges and each provides full cycle rejection of every frequency but the corresponding determined frequency and passes an output voltage having the corresponding determined frequency. Each of a plurality of feedbacks extends between a corresponding one of the filters and the corresponding one of the power supplies for regulating variations in input and output voltages thereby permitting the use of the bridges and the filters.

DESCRIPTION OF THE INVENTION

Our invention relates to a tunable sine wave ringing generator. More particularly, our invention relates to a tunable sine wave ringing generator for producing a plurality of output signals having determined frequencies.

Tunable sine wave ringing generators of known type utilize parallel inverters and ferroresonant transformers. Such equipment, and specifically the Class B amplifier, which it utilizes, is expensive and may, under certain circumstances, be unreliable in operation.

The principal object of the present invention is to provide a new and improved tunable sine wave ringing generator. An object of the present invention is to provide a tunable sine wave ringing generator having good line versus load regulation. An object of the present invention is to provide a tunable sine wave ringing generator which provides an output with low distortion for all types of loads. An object of the present invention is to provide a tunable sine wave ringing generator which is efficient in operation. An object of the present invention is to provide a tunable sine wave ringing generator which has inherent safety features against high voltage and faults. Another object of the present invention is to provide a tunable sine wave ringing generator which utilizes inexpensive equipment and is effective and reliable in operation.

In accordance with the present invention, a tunable sine wave ringing generator for producing a plurality of output signals having determined frequencies comprises a plurality of oscillators each of which provides a signal having a determined frequency. A plurality of shapers and amplifiers are connected to the oscillators and each shapes and amplifies the signals provided by the oscillators. A plurality of bridges are connected to the shapers and amplifiers and each provides full wave switching of signals provided by the shapers and amplifiers under the control of the signals. Each of a plurality of power supplies is connected to a corresponding one of the bridges for energizing the corresponding bridge. An input is connected to the plurality of power supplies for energizing the power supplies with an input voltage. A plurality of filters are connected to the bridges and each provides full cycle rejection of every frequency but the corresponding determined frequency and passes an output voltage having the corresponding determined frequency. Each of a plurality of feedbacks extends between a corresponding one of the filters and the corresponding one of the power supplies for regulating variations in input and output voltages thereby permitting the use of the bridges and filters.

Each of the determined frequencies is different from the others of the determined frequencies. Each bridge comprises a switching bridge circuit including transistors connected in different current paths and each of the filters comprises an inductance-capacitance filter. Each of the shapers and amplifiers provides pulses of positive and negative polarity from the signals provided by said oscillator. Each bridge comprises means for applying the signals provided by the corresponding shaper and amplifier to a transistor of each current path to control the conductive direction of the bridge circuit in accordance with the polarity of the pulses provided by the corresponding shaper and amplifier.

In order that the present invention may be readily carried into effect, it will now be described with reference to the accompanying drawings, wherein.

Figure 1:
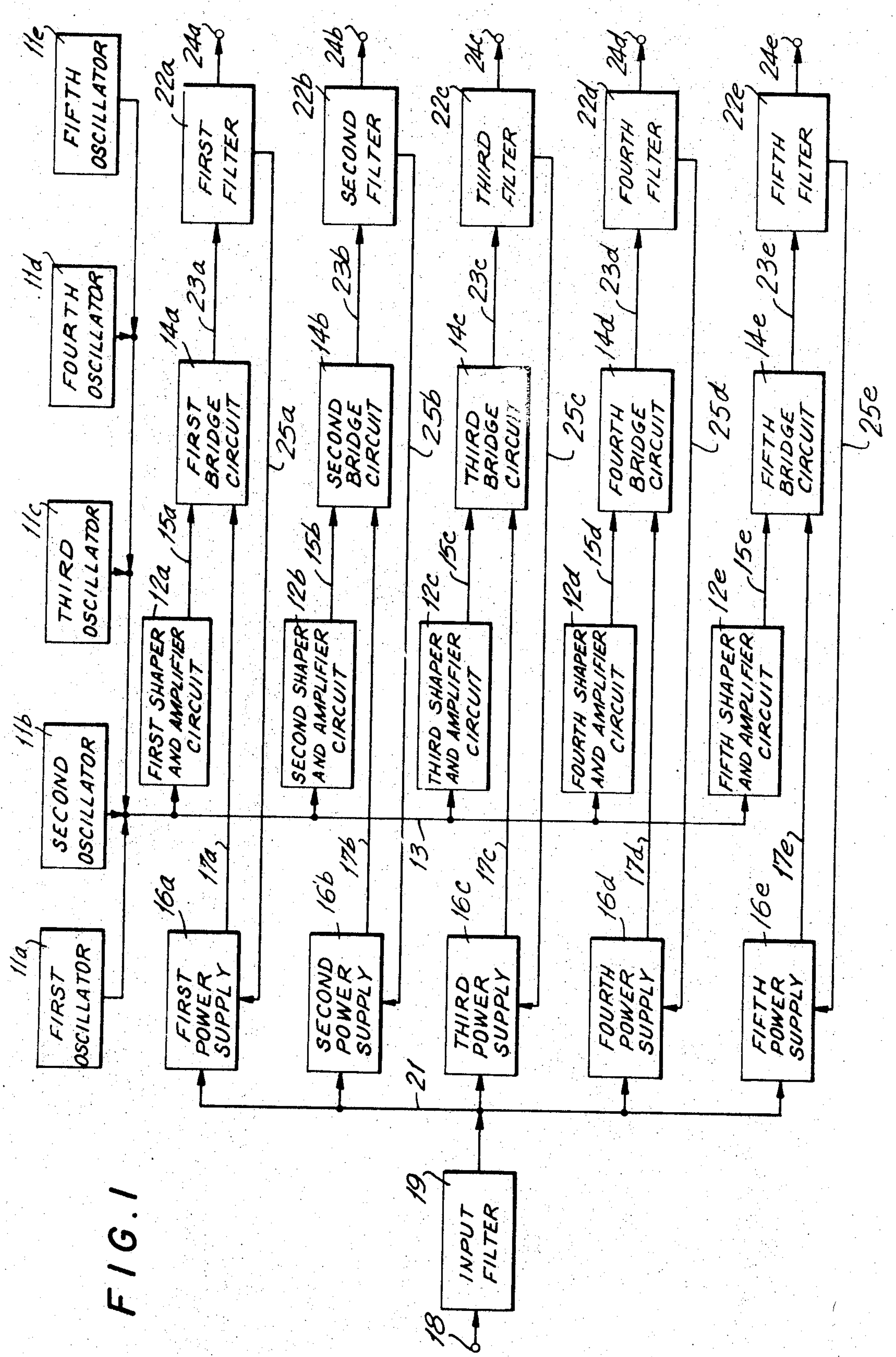
FIG. 1 is a block diagram of an embodiment of the tunable sine wave ringing generator of the present invention.

In FIG. 1, which is a block diagram of the tunable sine wave ringing generator of the present invention, each of a plurality of oscillators **11*a*, 11*b*, 11*c*, 11*d* and 11*e* may comprise the same circuitry. Each of the oscillators 11*a* to 11*e* produces a tuned specific range of frequencies which is different from the range of frequencies produced by the others of said oscillators. Thus, for example, the first oscillator 11*a* may produce a signal in a range of frequencies from 16 to 25 cycles per second or hertz, the second oscillator 11*b* may produce a signal in a frequency range from 20 to 33 cycles per second or hertz, the third oscillator 11*c* may produce a signal in a frequency range of 30 to 45 cycles per second or hertz, the fourth oscillator 11*d* may produce a signal in a range of frequencies from 40 to 55 cycles per second or hertz, and the fifth oscillator 11*e*** may produce a signal in a range of frequencies from 50 to 66 cycles per second or hertz.

Figure 3:
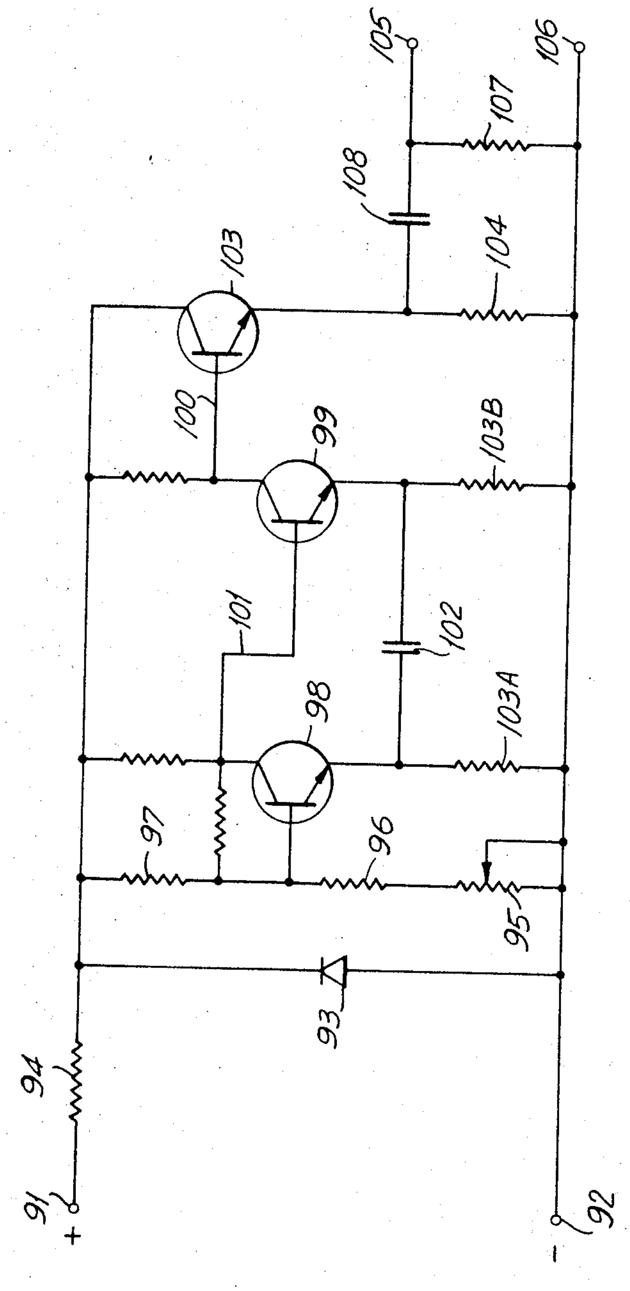
FIG. 3 is a circuit diagram of an oscillator which may be utilized in the generator of FIG. 1.

Each of the oscillators **11*a* to 11*e* may comprise any suitable oscillator circuit such as, for example, that shown in FIG. 3. Although five oscillators 11*a* to 11*e*** are shown in FIG. 1, the number of oscillators utilized depends upon the number of output frequencies to be produced by the generator. In the illustrated embodiment of FIG. 1, the first oscillator thus produces a signal having a determined frequency of essentially 20 cycles per second, the second oscillator produces a signal having a determined frequency of essentially 30 cycles per second, the third oscillator produces a signal having a determined frequency of essentially 40 cycles per second. The fourth oscillator produces a signal having a determined frequency of essentially 50 cycles per second and the fifth oscillator produces a signal having a determined frequency of essentially 60 cycles per second.

A plurality of shaper and amplifier circuits 12*a*, 12*b*, 12*c*, 12*d* and 12*e* each comprise essentially the same circuit which functions as a driving circuit and which is energized by the signal produced by the oscillators 11*a* to 11*e*. Each of the shaper and amplifier circuits 12*a* to 12*e* has an input connected to a common cable 13 to which the outputs of the oscillators 11*a* to 11*e* are connected. Each of the shaper and amplifier circuits 12*a* to 12*e* may comprise any suitable pulse shaping and amplifying circuitry. A suitable shaper and amplifier circuit is that shown in FIG. 4. Each shaper and amplifier circuit functions to shape and amplify the output signals of the oscillators 11*a* to 11*e* to thereby prepare such signals for the bridge circuitry succeeding the shaper and amplifier circuits.

The output of the first shaper and amplifier circuit 12*a* is connected to the input of a first bridge circuit 14*a* via a lead 15*a*, the output of the second shaper and amplifier circuit 12*b* is connected to the input of a second bridge circuit 14*b* via a lead 15*b*, the output of the third shaper and amplifier circuit 12*c* is connected to the input of a third bridge circuit 14*c* via a lead 15*c*, the output of the fourth shaper and amplifier circuit 12*d* is connected to the input of a fourth bridge circuit 14*d* via a lead 15*d* and the output of the fifth shaper and amplifier circuit 12*e* is connected to the input of a fifth bridge circuit 14*e* via a lead 15*e*.

Each of the bridge circuits 14*a* to 14*e* may be the same as the others. Each of the bridge circuits 14*a* to 14*e* may comprise any suitable bridge circuit such as, for example, that shown in FIG. 5. Each of the bridge circuits 14*a* to 14*e* functions to provide full wave switching of the signals provided by the shaper and amplifier circuit to which it is connected under the control of such signals. A bridge circuit which may be utilized in the generator of FIG. 1 is described in detail with reference to FIG. 5.

A plurality of power supplies 16*a*, 16*b*, 16*c*, 16*d* and 16*e* may each comprise the same circuit arrangement. The first power supply 16*a* has an output connected to the first bridge circuit 14*a* via a lead 17*a* and energizes said first bridge circuit, the second power supply 16*b* has an output connected to the second bridge circuit 14*b* via a lead 17*b* and energizes said second bridge circuit, the third power supply 16*c* has an output connected to the third bridge circuit 14*c* via a lead 17*c* and energizes said third bridge circuit, the fourth power supply 16*d* has an output connected to the fourth bridge circuit 14*d* via a lead 17*d* and energizes said fourth bridge circuit and the fifth power supply 16*e* has an output connected to the fifth bridge circuit 14*e* via a lead 17*e* and energizes said fifth bridge circuit.

Each of the power supplies 16*a* to 16*e* may comprise any suitable power supply. A suitable power supply is that shown in FIG. 2, for example. Input power is supplied to the power supplies 16*a* to 16*e* via an input terminal 18, an input filter 19 and a lead 21 which is connected in common between the output of said filter and the inputs of said power supplies. The input voltage energizes the power supplies 16*a* to 16*e*.

The input of a first filter 22*a* is connected to the output of the first bridge circuit 14*a* via a lead 23*a*, the input of a second filter 22*b* is connected to the output of the second bridge circuit 14*b* via a lead 23*b*, the input of a third filter 22*c* is connected to the output of the third bridge circuit 14*c* via a lead 23*c*, the input of a fourth filter 22*d* is connected to the output of the fourth bridge circuit 14*d* via a lead 23*d* and the input of a fifth filter 22*e* is connected to the output of the fifth bridge circuit 14*e* via a lead 23*e*. Each of the filters 22*a* to 22*e* may comprise the same circuit. Each of the filters 22*a* to 22*e* may comprise any suitable circuit such as, for example, that shown in FIG. 6.

The first filter 22*a* provides full cycle rejection of every frequency except the corresponding determined frequency of the first oscillator 11*a* and provides an output voltage having such determined frequency. The second filter 22*b* provides full cycle rejection of every frequency except the corresponding determined frequency of the second oscillator 11*b* and providing an output voltage having such determined frequency. The third filter 22*c* provides full cycle rejection of every frequency except the corresponding determined frequency of the third oscillator 11*c* and provides an output voltage having such determined frequency. The fourth filter 22*d* provides full cycle rejection of every frequency except the corresponding determined frequency of the fourth oscillator 11*d* and provides an output voltage having such determined frequency. The fifth filter 22*e* provides full cycle rejection of every frequency except the corresponding determined frequency of the fifth oscillator 11*e* and provides an output voltage having such determined frequency.

The first filter 22*a* thus provides an output having the frequency of the first oscillator 11*a* at a first output terminal 24*a*, the second filter 22*b* provides an output having the same frequency as the second oscillator 11*b* at a second output terminal 24*b*, the third filter 22*c* provides an output having the same frequency as the third oscillator 11*c* at a third output terminal 24*c*, the fourth filter 22*d* provides an output having the same frequency as the fourth oscillator 11*d* at a fourth output terminal 24*d* and the fifth filter 22*e* provides an output having the same frequency as the fifth oscillator 11*e* at a fifth output terminal 24*e*.

In accordance with the present invention, a first feedback 25*a* is provided and extends between the first filter 22*a* and the first power supply 16*a*. A second feedback 25*b* is provided and extends between the second filter 22*b* and the second power supply 16*b*. A third feedback 25*c* is connected and extends between the third filter 22*c* and the third power supply 16*c*. A fourth feedback 25*d* is connected and extends between the fourth filter 22*d* and the fourth power supply 16*d*. A fifth feedback 25*e* is connected and extends between the fifth filter 22*e* and the fifth power supply 16*e*.

Figure 5:
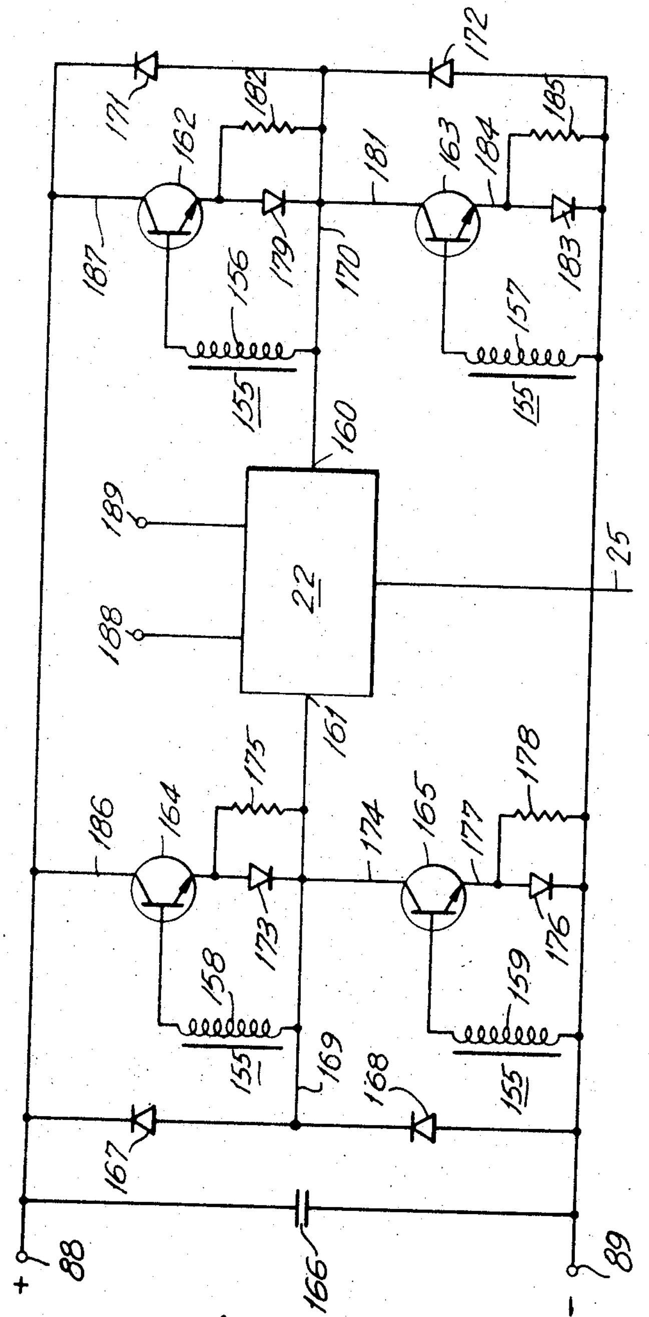
FIG. 5 is a circuit diagram of a bridge circuit which may be utilized in the generator of FIG. 1.
Figure 6:
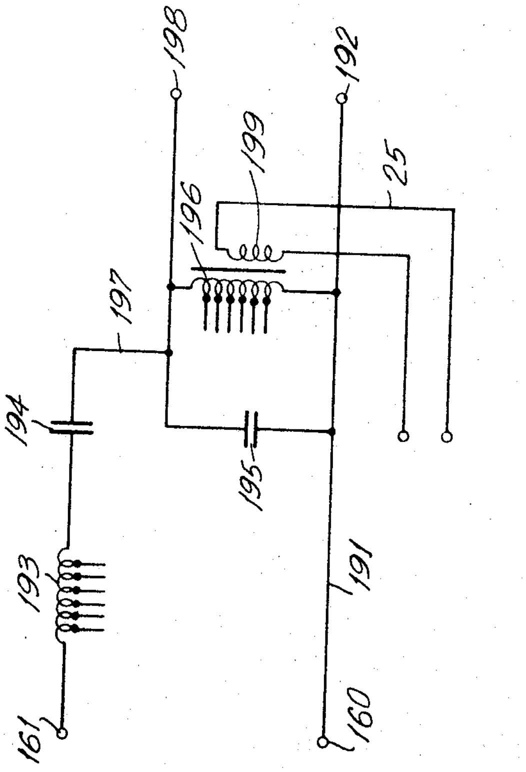
FIG. 6 is a circuit diagram of a filter which may be utilized in the generator of FIG. 1.

The filters 22*a* to 22*e* filter out ripples in their inputs and transmit a sample signal via the feedbacks 25*a* to 25*e* to regulate variations in the input and output voltage and thereby permit the use of the bridge and filter circuits shown in FIGS. 5 and 6. Since such circuits are of simple and inexpensive construction, their use represents a considerable saving in expense. The use of such circuits is permitted due to the regulation of the input and output voltages by the feedbacks.

In operation, the feedbacks 25*a* to 25*e* regulate the input voltage fluctuations at the input terminal 18 and the output voltage fluctuations at the filters 22*a* to 22*e*, thereby permitting the use of a simple transistor circuit (FIG. 5) as each bridge circuit 14*a* to 14*e* and a simple LC filter (FIG. 6) as each filter circuit 22*a* to 22*e*. Each of the oscillators 11*a* to 11*e* provides a tuned specific range of frequencies different from the others. The signals produced by the oscillators 11*a* to 11*e* are shaped and amplified by the shaper and amplifier circuits 12*a* to 12*e* and are then switched by the bridge circuits 14*a* to 14*e* in accordance with the pulse polarity of said signals. Each of the bridge circuits is energized by the corresponding one of the power supplies 16*a* to 16*e*. Each of the filters 22*a* to 22*e* rejects all frequencies except the determined frequency of a corresponding one of the oscillators 11*a* to 11*e*. The ringing signals of different frequencies are provided at output terminals 24*a* to 24*e*. Thus, in the present example, an output ringing signal of substantially 20 cycles per second is provided at the output terminal 24_a_, an output ringing signal of substantially 30 cycles per second is provided at the output terminal 24_b_, an output ringing signal of substantially 40 cycles per second is provided at the output terminal 24_c_, an output ringing signal of substantially 50 cycles per second is provided at the output terminal 24_d_, and an output ringing signal of substantially 60 cycles per second is provided at the output terminal 24_e_.

Figure 2:
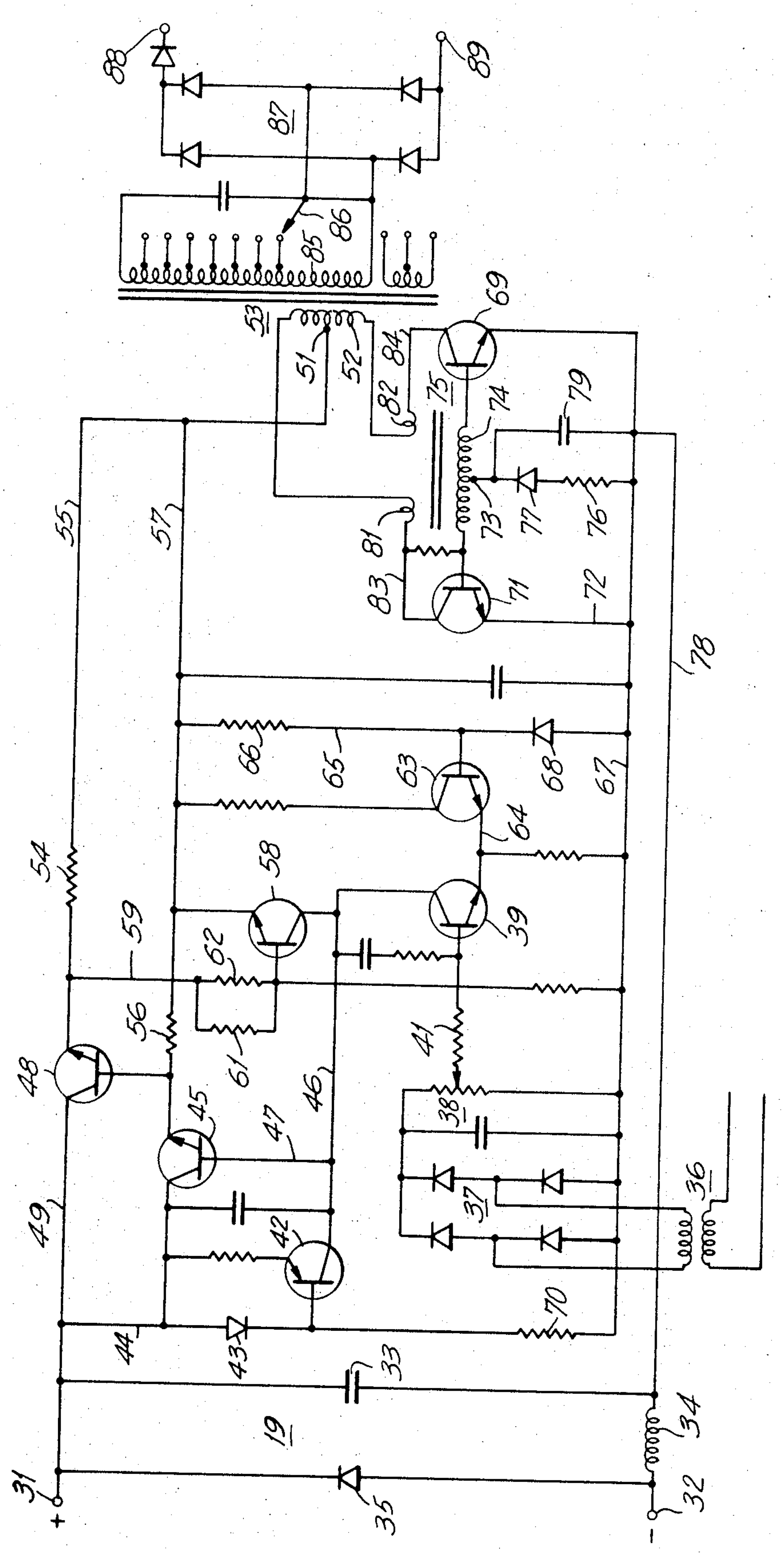
FIG. 2 is a circuit diagram of a power supply which may be utilized in the generator of FIG. 1.

FIG. 2 is a power supply which may be utilized in the generator of FIG. 1. Each of the power supplies 16_a_ to 16_e_ may comprise the circuit of FIG. 2. In FIG. 2, the input voltage supplied to the input filter 19 is applied to input terminals 31 and 32. The filter 19 comprises a capacitor 33 connected in series with an inductor 34, the series connection of which is connected between the input terminals 31 and 32. A diode 35 is connected between the input terminals 31 and 32. The feedback from the corresponding one of the filters 22_a_ to 22_e_ (FIG. 1) is coupled to the power supply via a transformer 36. The feedback voltage is rectified in a rectifier 37 and is smoothed in an RC circuit 38 and applied to the base electrode of a transistor 39 via a resistor 41.

The positive input voltage at the output of the filter 19 is applied to the base electrode of a transistor 42 via a diode 43 and a lead 44. The collector electrode of the transistor 42 is connected to the base electrode of a transistor 45 via leads 46 and 47. The collector electrode of the transistor 45 is connected to the positive output voltage of the filter 19. The emitter electrode of the transistor 45 is connected to the base electrode of a transistor 48. The collector electrode of the transistor 48 is connected to the positive output voltage of the filter 19 via lead 49.

The emitter electrode of the transistor 48 is connected to a tap 51 on the primary winding 52 of an output transformer 53 via a resistor 54 and a lead 55. The emitter electrode of the transistor 45 and the base electrode of the transistor 48 are connected to the tap 51 of the transformer winding 52 via a resistor 56 and a lead 57. The emitter electrode of the transistor 48 is connected to the base electrode of a transistor 58 via lead 59 and a pair of parallel connected resistors 61 and 62. The collector electrodes of the transistors 39, 42 and 58 are connected in common via the lead 46. The emitter electrode of the transistor 39 is connected to the emitter electrode of a transistor 63 via a lead 64. The base electrode of the transistor 63 is connected to the lead 57 via a lead 65 and a resistor 66 and is coupled to a lead 67 via a diode 68.

The lead 67 extends from the base electrode of the transistor 42 to the emitter electrode of a transistor 69 via a resistor 70 connected in said lead. The emitter electrode of a transistor 71 is connected to the lead 67 via a lead 72. The lead 67 is connected to a tap 73 on the primary winding 74 of a transformer 75 via a series connection of a resistor 76 and a diode 77. The negative voltage output of the filter 19 is coupled to the tap 73 of the transformer winding 74 via lead 78 and a capacitor 79 which is connected across the series connection of the resistor 76 and the diode 77. The end points or terminals of the primary winding 52 of the transformer 53 are directly connected to one end of a secondary winding 81 and one end of a tertiary winding 82, respectively, of the transformer 75. The other end of the secondary winding 81 is connected to the collector electrode of the transistor 71 via a lead 83 and the other end of the tertiary winding 82 is connected to the collector electrode of the transistor 69 via a lead 84.

The output transformer 53 comprises a secondary winding 85 having a plurality of taps connected at determined intervals thereon from which the output voltage of the power supply may be derived via a switch arm 86. The output voltage of the power supply is rectified in a rectifier 87 and is provided at output terminals 88 and 89. The output terminals 88 and 89 are connected to the corresponding one of the bridges 14_a_ to 14_e_ (FIG. 1).

FIG. 3 is an oscillator circuit which may be utilized as each of the oscillators 11_a_ to 11_e_ of the generator of FIG. 1. In FIG. 3, apositive DC voltage is applied to an input terminal 91 and a negative DC voltage is applied to an input terminal 92. The input voltage may comprise, for example, 48 volts. A diode 93 is connected in series with a resistor 94 between the input terminals 91 and 92. The positive DC voltage is applied to a potentiometer which is connected in parallel with the diode 93 and in series with the resistor 94 between the input terminals 91 and 92. The potentiometer comprises a variable resistor 95, a resistor 96 and a resistor 97 connected in series with each other.

The base electrode of a transistor 98 is connected to a common point in the connection between the resistors 96 and 97. The collector electrode of the transistor 98 is connected to the base electrode of a transistor 99 via a lead 101. The emitter electrodes of the transistors 98 and 99 are coupled to each other via a capacitor 102. The collector electrode of the transistor 99 is connected to the base electrode of a transistor 103 via a lead 100. An emitter resistor 103A is connected to the emitter electrode of the transistor 98 and an emitter resistor 103B is connected to the emitter electrode of the transistor 99. The resistors 103A and 103B and the capacitor 102 function to control the frequency of the oscillator.

The output of the oscillator is derived from the emitter electrode of the transistor 103 and is provided across a resistor 104 which is connected to said emitter electrode. The output voltage, which is applied to the shaper and amplifier circuits 12_a_ to 12_e_ of FIG. 1, is provided at output terminals 105 and 106 via an RC circuit 107, 108. The resistor 107 is shunted across the output terminals 105 and 106 and the capacitor 108 is connected between the emitter electrode of the transistor 103 and the output terminal 105.

Figure 4:
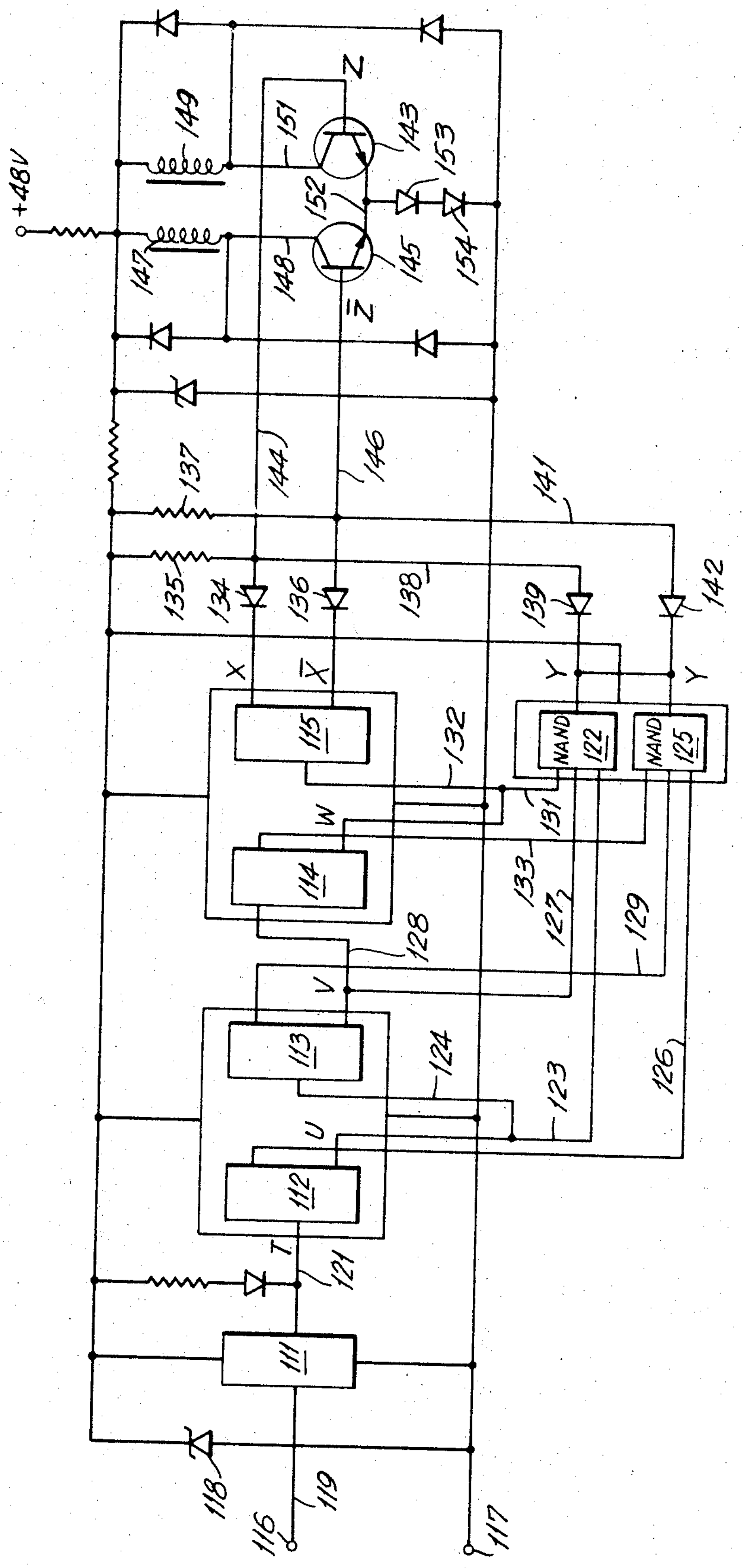
FIG. 4 is a circuit diagram of a shaper and amplifier circuit which may be utilized in the generator of FIG. 1.

FIG. 4 is a shaper and amplifier circuit which may be utilized as each of the shaper and amplifier circuits 12_a_ to 12_b_ of the generator of FIG. 1. In FIG. 4, a plurality of flip flops or bistable multivibrators 111, 112, 113, 114 and 115 are connected in series arrangement with each other. The signals produced by the oscillators 11_a_ to 11_e_ (FIG. 1) are applied to the input terminals 116 and 117. A Zener diode 118 is connected to the input terminal 117.

The signals from the oscillators 11_a_ to 11_e_ are applied to the first flip flop 111 via a lead 119 which is connected to the input terminal 116. The output of the first flip flop 111 is connected to the input of the second flip flop 112 via a lead 121. The output of the second flip flop 112 is connected to an input of a first NAND gae 122 via a lead 123 and to the input of the third flip flop 113 via a lead 124. The output of the second flip flop is also connected to an input of a second NAND gate 125 via a lead 126.

The output of the third flip flop 113 is connected to a second input of the first NAND gate 122 via a lead 127 and to the input of the fourth flip flop 114 via a lead 128. The output of the third flip flop 113 is also connected to the second input of the second NAND gate 125 via a lead 129. The output of the fourth flip flop 114 is connected to the third input of the first NAND gate 122 via a lead 131 and to the input of the fifth flip flop 115 via a lead 132. The output of the fourth flip flop 114 is also connected to the third input of the second NAND gate 125 via a lead 133.

The outputs of the fifth flip flop 115 are connected to a first input of each of a pair of AND gates 134, 135 and 136, 137. The AND gate 134, 135 comprises a diode 134 and a resistor 135 connected in series and the AND gate 136, 137 comprises a diode 136 and a resistor 137 connected in series. The output of the first NAND gate 122 is connected to the second input of the first AND gate 134, 135 via a lead 138 and a diode 139. The output of the second NAND gate 125 is connected to the second input of the second AND gate 136, 137 via a lead 141 and a diode 142. The output of the first AND gate 134, 135 is connected to the base electrode of a transistor 143 via a lead 144. The output of the second AND gate 136, 137 is connected to the base electrode of a transistor 145 via a lead 146.

The AND and NAND gates may comprise any suitable logical circuits such as, for example, those shown on pages 180 to 183 of "Computer Basic," vol. 3, "Digital Computers—Mathematics and Circuitry," by Technical Education and Management, Inc., Howard W. Sams & Co., Inc., The Bobbs-Merrill Company, Inc., Indianapolis and New York, 1962, and pages 99 to 102 of vol. 6 of the same series, entitled "Solid-State Computer Circuits." Suitable flip flops are shown and described on pages 116 to 125 of the last-mentioned text. A suitable AND circuit and NAND circuit are shown and described on pages 92 and 93 of "Directory of Electronic Circuits," by Matthew Mandl, Prentice-Hall, Inc., Englewood Cliffs, N.J., 1966.

A first output winding 147 is connected to the collector electrode of the transistor 145 via a lead 148 and a second output winding 149 is connected to the collector electrode of the transistor 143 via a lead 151. The emitter electrodes of the transistors 143 and 145 are connected to each other via a lead 152 which is connected to the negative input terminal via a pair of diodes 153 and 154. The first and second output windings 147 and 149 constitute the first and second input windings of a transformer 155, as shown in FIG. 5 and included in the corresponding one of each of the bridge circuits 14_a_ to 14_e_, so that the output voltages are applied to the corresponding bridge circuit via said transformer.

Figure 7:
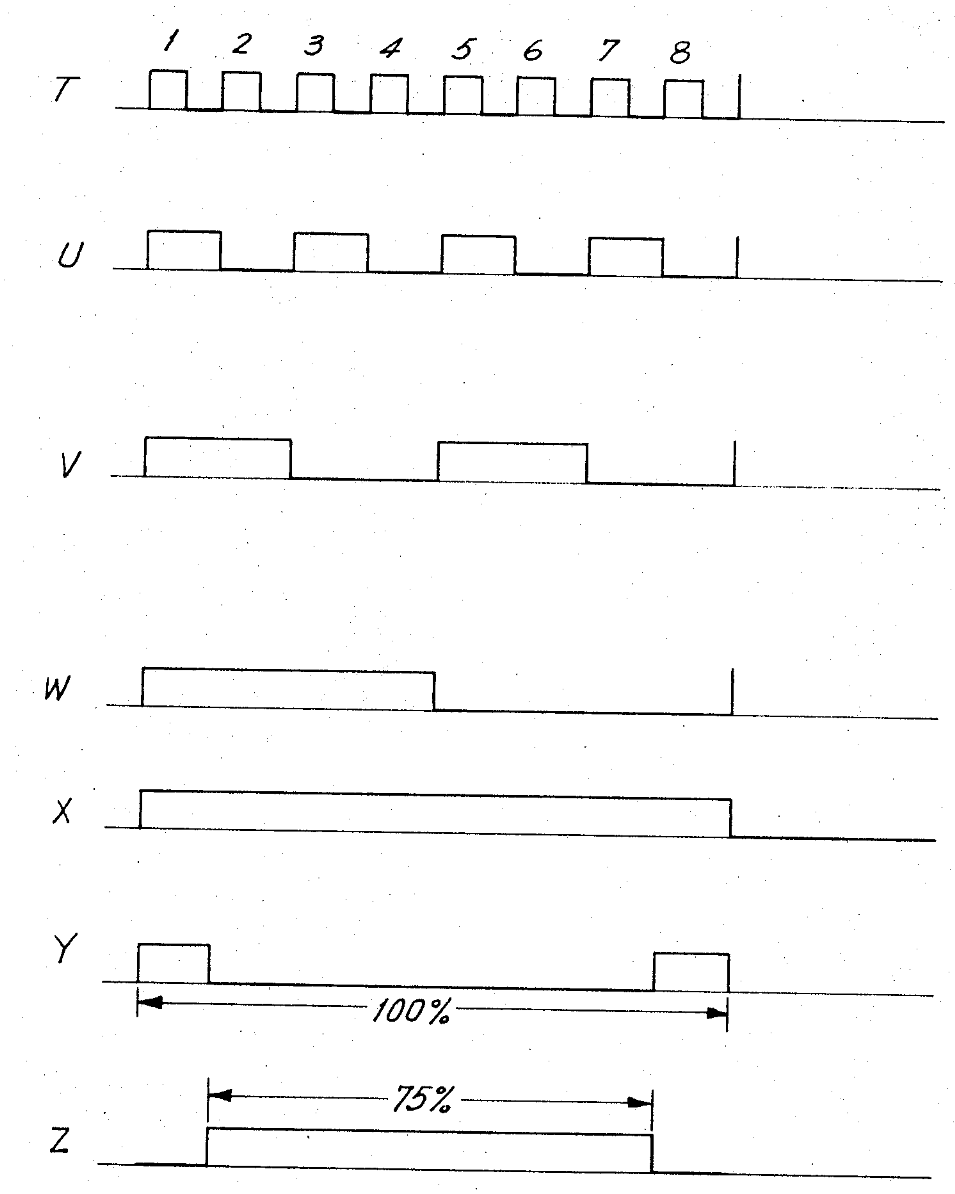
FIG. 7 is a graphical presentation of a plurality of curves illustrating the waveforms at various points in the shaper and amplifier.

The operation of each of the shaper and amplifier circuits 12_a_ to 12_e_ may be more readily understood by reference to the curves T, U, V, W, X, Y and Z of FIG. 7. Each of the curves T to Z represents the signal which appears at the correspondingly identified point in the circuit of FIG. 4. The curves T to Z of FIG. 7 illustrate the operation of each of the shaper and amplifier circuits 12_a_ to 12_e_ in shaping and amplifying the signals produced by the oscillators 11_a_ to 11_e_ (FIG. 1).

FIG. 5 is a bridge circuit which may be utilized as each of the bridge circuits 14_a_ to 14_e_ of the generator of FIG. 1. In the disclosed embodiment of FIG. 5, the corresponding filter 22 is included in block form to illustrate its connection in the bridge circuit. The feedback 25 is the feedback connecting the corresponding one of the filters 22_a_ to 22_e_ to the corresponding one of the power supplies 16_a_ to 16_e_ (FIG. 1). The signals shaped and amplified by the corresponding shaper and amplifier circuit are applied to first, second, third and fourth output windings 156, 157, 158 and 159, respectively, of the transformer 155.

The first output winding 156 of the transformer 155 is connected between a first input 160 of the filter 22 and the base electrode of a transistor 162. The second output winding 157 of the transformer 155 is connected between the negative output voltage terminal 89 (FIG. 2) of the corresponding power supply and the base electrode of a transistor 163. The third output winding 158 of the transformer 155 is connected between the second input 161 of the filter 22 and the base electrode of a transistor 164. The fourth output winding 159 of the transformer 155 is connected between the terminal 89 and the base electrode of a transistor 165.

A capacitor 166 is connected in shunt between the positive output voltage terminal 88 (FIG. 2) of the corresponding power supply and the terminal 89. A pair of diodes 167 and 168 are connected in series between the terminals 88 and 89. The third output winding 158 of the transformer 155 is connected to a common point in the connection between the diodes 167 and 168 via a lead 169. A second pair of diodes 171 and 172 are connected in series between the terminals 88 and 89. The first output winding 156 of the transformer 155 is connected to a common point in the connection between the diodes 171 and 172 via a lead 170.

The emitter electrode of the transistor 164 is connected to the collector electrode of the transistor 165 via a diode 173 and a lead 174. A resistor 175 is connected in shunt across the diode 173. The emitter electrode of the transistor 165 is connected to the terminal 89 via a diode 176 and a lead 177. A resistor 178 is connected in shunt across the diode 176.

The emitter electrode of the transistor 162 is connected to the collector electrode of the transistor 163 via a diode 179 and a lead 181. A resistor 182 is connected in shunt across the diode 179. The emitter electrode of the transistor 163 is connected to the terminal 89 via a diode 183 and a lead 184. A resistor 185 is connected in shunt across the diode 183. The collector electrode of the transistor 164 is connected to the terminal 88 via a lead 186 and the collector electrode of the transistor 162 is connected to the terminal 88 via a lead 187. The output of the filter 22 is provided at output terminals 188 and 189.

In FIG. 5, the transistors 162 and 165 function as a first current path for signals of positive polarity received from the corresponding shaper and amplifier circuit and the transistors 164 and 163 function as a second current path for signals of negative polarity provided by the corresponding shaper and amplifier circuit. Thus, when signals of positive polarity are supplied to the terminal 88, they are conducted through the filter 22 via the first input 160 to the second input 161 and the transistors 162 and 165 and provide an output at the terminals 188 and 189. When signals of negative polarity are supplied to the terminal 89, they are conducted through the filter 22 via the first input 160 to the second input 161 and the transistors 163 and 164 and provide an output at the terminals 188 and 189. The switching operation of the bridge circuit of FIG. 5 is thus controlled by the polarity of the pulses provided by the corresponding shaper and amplifier circuit to provide a full cycle output at the output terminals 188 and 189 of the filter 22.

FIG. 6 is a filter circuit which may be utilized as each of the filters 22_a_ to 22_e_ of the generator of FIG. 1. In FIG. 6, which is a simple LC filter circuit, the first terminal 160 is connected via a lead 191 to an output terminal 192. The second terminal 161 of the filter is connected to one end of a series circuit arrangement comprising a variable inductor 193 and a capacitor 194. A capacitor 195 and a variable inductor 196 are connected in parallel to the lead 191. The series circuit arrangement 193, 194 is connected to the parallel circuit arrangement 195, 196 via a lead 197. An output terminal 198 is connected to one end of the variable inductor 196 of the parallel circuit arrangement and the output terminal 192 is connected to the other end of said variable inductor. The feedback 25 to the corresponding power supply (FIG. 1) is coupled to the variable inductor 196 via an output winding 199.

The output of the filter is provided at the output terminals 192 and 198 and constitutes a generator ringing signal of a frequency which is determined by the adjustment of the filter and which corresponds to the frequency produced by a corresponding one of the oscillators 11_a_ to 11_e_ (FIG. 1). The filter rejects all frequencies other than that which it is adjusted to pass. Thus, each of the filters 22_a_ to 22_e_ of FIG. 1 produces a ringing signal at its corresponding output 24_a_ to 24_e_, which corresponds to the terminals 192 and 198, which is of a frequency different from the frequencies produced at the others of said output terminals.

While the invention has been described by means of a specific example and in a specific embodiment, we do not wish to be limited thereto, for obvious modifications will occur to those skilled in the art without departing from the spirit and scope of the invention.

We claim:

1. A tunable sine wave ringing generator for producing a plurality of output signals having determined frequencies, said generator comprising:

a plurality of oscillator means each providing a signal having a determined frequency;

a plurality of shaping and amplifying means connected to said oscillator means each shaping and amplifying the signals provided by said oscillator means;

a plurality of bridge means connected to said shaping and amplifying means each providing full wave switching of the signals provided by said shaping and amplifying means under the control of said signals;

a plurality of power supply means each connected to a corresponding one of said bridge means for energizing the corresponding bridge means;

input means connected to said plurality of power supply means for energizing said power supply means with an input voltage;

a plurality of filter means connected to said bridge means each providing full cycle rejection of every frequency but the corresponding determined frequency and passing an output voltage having said corresponding determined frequency; and a plurality of feedback means each extending between a corresponding one of said filter means and the corresponding one of said power supply means for regulating variations in input and output voltages thereby permitting the use of said bridge and filter means.

2. A tunable sine wave ringing generator as claimed in claim 1, wherein each of said determined frequencies is different from the others of said determined frequencies.

3. A tunable sine wave ringing generator as claimed in claim 1, wherein each said bridge means comprises a switching bridge circuit including transistors connected in different current paths and each of said filter means comprises an inductance-capacitance filter.

4. A tunable sine wave ringing generator as claimed in claim 1, wherein each said shaping and amplifying means provides pulses of positive and negative polarity from the signals provided by said oscillator means, each bridge means comprises a switching bridge circuit including transistors connected in different current paths and means for applying the signals provided by the corresponding shaping and amplifying means to a transistor of each current path to control the conductive direction of said bridge circuit in accordance with the polarity of the pulses provided by the corresponding shaping and amplifying means and each of said filter means comprises an inductance-capacitance filter.

No references cited.

JOHN KOMINSKI, Primary Examiner

U.S. Cl. X.R.

331—113; 321—18; 307—260